(12) United States Patent
Shikama et al.

(10) Patent No.: US 7,480,591 B2
(45) Date of Patent: Jan. 20, 2009

(54) MISFIRE DETECTING APPARATUS FOR INTERNAL COMBUSTION ENGINE

(75) Inventors: Mahito Shikama, Wako (JP); Toshinori Tsukamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/898,235

(22) Filed: Sep. 11, 2007

(65) Prior Publication Data

US 2008/0103681 A1    May 1, 2008

(30) Foreign Application Priority Data

Oct. 30, 2006    (JP) .............................. 2006-294114

(51) Int. Cl.
 *G06F 11/30*    (2006.01)
 *G06F 15/00*    (2006.01)
(52) U.S. Cl. ....................................... 702/182
(58) Field of Classification Search ................ 702/182
 See application file for complete search history.

(56) References Cited

U.S. PATENT DOCUMENTS

| 5,373,732 | A | * | 12/1994 | Kuroda et al. | ............. | 73/114.04 |
| 5,377,537 | A | | 1/1995 | James | | |
| 5,493,901 | A | * | 2/1996 | Kuroda et al. | ............. | 73/114.04 |
| 5,528,931 | A | | 6/1996 | James et al. | | |
| 5,539,644 | A | * | 7/1996 | Ichikawa et al. | ............. | 701/111 |
| 6,023,964 | A | * | 2/2000 | Kanbara et al. | .......... | 73/114.04 |
| 6,968,268 | B2 | * | 11/2005 | Yamada et al. | ............... | 701/111 |
| 2005/0241376 | A1 | * | 11/2005 | Miyata et al. | ............... | 73/117.3 |
| 2007/0157713 | A1 | * | 7/2007 | Tsukamoto et al. | ........ | 73/117.3 |
| 2007/0265764 | A1 | * | 11/2007 | Nakata et al. | ............... | 701/105 |

FOREIGN PATENT DOCUMENTS

| EP | 1 677 092 A2 | 7/2006 |
| JP | 03-246347 A | 11/1991 |
| JP | 07-119536 A | 5/1995 |
| JP | 07-151009 A | 6/1995 |

* cited by examiner

*Primary Examiner*—Michael P. Nghiem
*Assistant Examiner*—Cindy H Khuu
(74) *Attorney, Agent, or Firm*—Arent Fox LLP

(57) ABSTRACT

A misfire detecting apparatus for detecting a misfire of an internal combustion engine based on a detected rotational speed parameter. A moving averaging calculation is performed with respect to data of the detected rotational speed parameter to calculate an averaged speed parameter, a number of the data being equal to a sampling number NTDC. A reference value of the averaged speed parameter and a relative speed parameter are calculated. The relative speed parameter is a deviation of the averaged speed parameter detected at every predetermined crank angle from the reference value. An integrated value of the relative speed parameter is calculated and a misfire determination is performed based on the integrated value. The sampling number (NTDC) is determined by an equation:

$$NTDC = 720/(N \times D\theta)$$

where (N) is a number of cylinders and (D$\theta$) is a sampling angular period (degree) of the rotational speed parameter.

9 Claims, 6 Drawing Sheets

MISFIRE DETECTING APPARATUS FOR INTERNAL COMBUSTION ENGINE

BACKGROUND OF THE INVENTION

1. Field of the Invention

The present invention relates to a misfire detecting apparatus for an internal combustion engine and, particularly, to a misfire detecting apparatus for determining a misfire based on a rotational speed parameter according to an engine rotational speed.

2. Description of the Related Art

When performing a misfire determination based on the rotational speed parameter according to the engine rotational speed, an incorrect misfire determination may result if the rotational speed parameter changes due to a factor other than a factor of engine combustion. For example, in a high rotational speed region, where the engine rotational speed exceeds 5000 rpm, a rotational speed change due to torsion of the crankshaft (crankshaft torsion) of the engine may become relatively large. Accordingly, an incorrect misfire determination may easily be made when such a determination is based on the rotational speed parameter.

Japanese Patent Laid-open No. H7-151009 (JP '009) discloses a method for eliminating the influence of crankshaft torsion. Specifically, a correction coefficient for eliminating the influence of crankshaft torsion is previously calculated according to the engine rotational speed and the load on the engine and is stored in a map. During a normal engine operation, the map is retrieved according to the rotational speed and the load to calculate the correction coefficient and correct the detected rotational speed parameter with the correction coefficient.

According to the method disclosed in JP '009, it is necessary to make a map having correction coefficients, which are previously and experimentally obtained, and manpower for making the map is required. Further, the rotational speed changing due to crankshaft torsion greatly changes depending on the ambient temperature. Therefore, in order to perform an accurate correction, it is necessary to perform the correction according to not only the engine rotational speed and the load on the engine but also the air temperature. It is very difficult to perform a perfect correction.

SUMMARY OF THE INVENTION

The present invention was made contemplating the above-described points, and an aspect of the invention is to provide a misfire detecting apparatus for an internal combustion engine, which eliminates the influence of crankshaft torsion using a simpler method, and still performs accurate misfire determination.

To attain the above-described aspect, the present invention provides a misfire detecting apparatus for an internal combustion engine having rotational speed parameter detecting means for detecting a rotational speed parameter (CRME) indicative of a rotational speed of the engine and detecting a misfire of the engine based on the detected rotational speed parameter. The misfire detecting apparatus includes moving averaging means, reference value calculating means, relative speed parameter calculating means, integrated value calculating means, and misfire determining means. The moving averaging means performs a moving averaging calculation with respect to data of the detected rotational speed parameter (CRME) to calculate an averaged speed parameter (OMG, CRMEM). A number of the data is equal to a sampling number NTDC. The reference value calculating means calculates a reference value (OMGR((k−1)NTDC), CRMER((k−1)NTDC)) of the averaged speed parameter. The relative speed parameter calculating means calculates a relative speed parameter (OMGREF, CRMEREF), which is a deviation of the averaged speed parameter (OMGR, CRMER) corresponding to the rotational speed parameter detected at every predetermined crank angle from the reference value (OMGR((k−1)NTDC), CRMER((k−1)NTDC)). The integrated value calculating means calculates an integrated value (MFJUD, MFJUDb) of the relative speed parameter. The misfire determining means performs a misfire determination based on the integrated value. The sampling number NTDC is determined by the equation:

$$NTDC = 720/(N \times D\theta)$$

where "N" is a number of cylinders of the engine, and "D$\theta$" is a sampling angular period (degree) of the rotational speed parameter.

With the above-described structural configuration, for example, in a six-cylinder engine, if the sampling angle period is set to "6" degrees, the sampling number NTDC is "20". The moving averaging calculation of the sampled data during the period of 120 degrees of the crank angle is performed, and the averaged speed parameter is calculated. Therefore, the frequency component (third harmonic component) of a frequency three times as high as the frequency corresponding to the engine rotational speed and harmonics of the third harmonic component is eliminated by the moving averaging calculation. Since the influence of crankshaft torsion greatly appears in the third harmonic component in the case of a six-cylinder engine (in the case of an N-cylinder engine, the influence greatly appears in the "N/2"th harmonic component), the above-described moving averaging calculation can almost entirely eliminate the influence of crankshaft torsion. Consequently, accurate misfire determination is performed, especially in the high rotational speed region of the engine. Further, the reference value of the averaged speed parameter is calculated, a deviation of the averaged speed parameter corresponding to the rotational speed parameter detected at every predetermined crank angle from the reference value is calculated as the relative speed parameter, and the misfire determination is performed based on the integrated value obtained by integrating the relative speed parameter. By appropriately setting the reference value, the integrated value of the relative speed parameter indicates a change in the output torque of the cylinder in the combustion stroke. Therefore, occurrence of a misfire is determined according to a result of the comparison between the integrated value and the determination threshold value. Since the determination is performed for each cylinder, it is easy to specify the cylinder in which a misfire has occurred regardless of the number of cylinders in the engine.

Preferably, the reference value (OMGR((k−1)NTDC), CRMER((k−1)NTDC)) is the averaged speed parameter corresponding to the rotational speed parameter detected when a piston of the cylinder, which is subjected to the misfire determination, is positioned in the vicinity of a compression top dead center.

With the above-described structural configuration, the reference value is set to the averaged speed parameter corresponding to the rotational speed parameter detected when the piston of the cylinder, which is subjected to the misfire determination, is positioned in the vicinity of the compression top dead center from which the combustion stroke starts. As such, the misfire determination is performed based on changes in the rotational speed parameter in the combustion stroke of the subject cylinder.

Preferably, the misfire determining means sets a determination threshold value (MFJTH) according to the rotational speed (NE) of the engine and a load (PBA) on the engine. The misfire determining means performs the misfire determination according to whether the integrated value (MFJUD, MFJUDb) is less than the determination threshold value (MFJTH, MFJTHb).

With the above-described structural configuration, the determination threshold value is set according to the engine rotational speed and the engine load, and the misfire determination is performed according to whether the integrated value, which is a parameter indicative of changes in the engine rotational speed, is less than the determination threshold value. Therefore, accurate misfire determination is performed regardless of the engine rotational speed and the engine load.

DETAILED DESCRIPTION OF THE PREFERRED EMBODIMENTS

Preferred embodiments of the present invention will now be described with reference to the drawings.

First Embodiment

Figure 1:
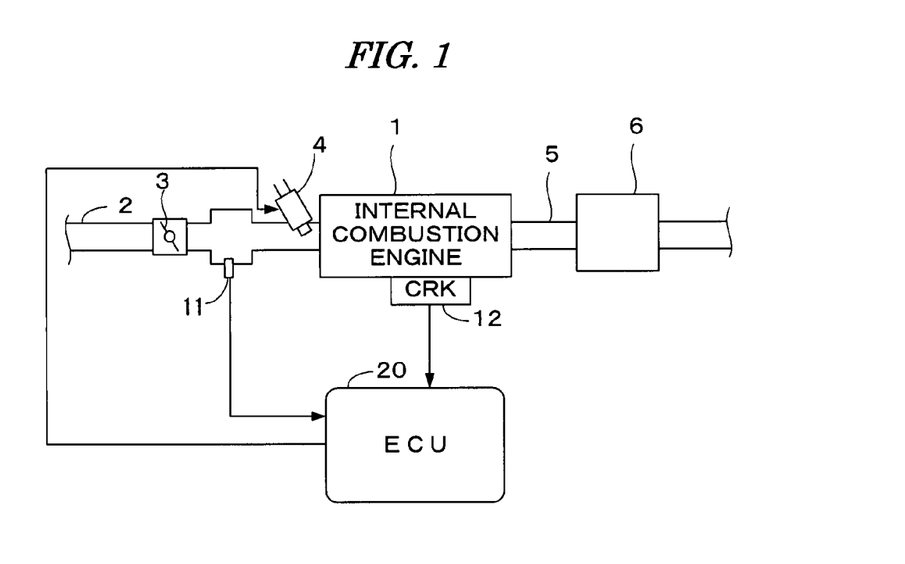
FIG. 1 is a schematic diagram of an internal combustion engine and a control system therefor according to one embodiment of the present invention.

FIG. 1 is a schematic diagram of an internal combustion engine and a control system therefor according to a first embodiment of the present invention. The internal combustion engine 1 (hereinafter referred to as "engine") has six cylinders and is provided with an intake pipe 2 and an exhaust pipe 5. The intake pipe 2 is provided with a throttle valve 3. The exhaust pipe 5 is provided with a catalytic converter 6 for purifying exhaust gases.

A fuel injection valve 4 is provided for each cylinder at a position slightly upstream of an intake valve (not shown) in the intake pipe 2 and between the engine 1 and the throttle valve 3. Each fuel injection valve 4 is connected to a fuel pump (not shown) and electrically connected to an electronic control unit 20 (hereinafter referred to as "ECU 20"). A valve opening period of the fuel injection valve 4 is controlled by a control signal from the ECU 20.

An intake pressure (PBA) sensor 11 is provided immediately downstream of the throttle valve 3. The intake pressure sensor 11 detects a pressure in the intake pipe 2 and the detection signal is supplied to the ECU 20.

A crank angle position sensor 12 for detecting a rotational angle of the crankshaft (not shown) of the engine 1 is connected to the ECU 20. A signal corresponding to the detected rotational angle of the crankshaft is supplied to the ECU 20. The crank angle position sensor 12 includes a cylinder discrimination sensor which outputs a pulse (hereinafter referred to as "CYL pulse") at a predetermined angle position of a specific cylinder of the engine 1. The crank angle position sensor also includes a TDC sensor, which outputs a TDC pulse at a crank angle position of a predetermined crank angle before a top dead center (TDC) starting at an intake stroke in each cylinder (i.e., at every 120-degree crank angle in the case of a six-cylinder engine), and a CRK sensor for generating one pulse (hereinafter referred to as "CRK pulse") with a crank angle period (e.g., period of 6 degrees, shorter than the period of generation of the TDC pulse). The CYL pulse, the TDC pulse and the CRK pulse are supplied to the ECU 20. The CYL pulse, the TDC pulse and the CRK pulse are used to control the various timings, such as a fuel injection timing and an ignition timing, and to detect an engine rotational speed NE (engine revolving speed). Further, the ECU 20 detects a misfire occurring in the engine 1 based on a time interval of the CRK pulse being generated (hereinafter referred to as "time period parameter CRME").

The ECU 20 includes an input circuit, a central processing unit (hereinafter referred to as "CPU"), a memory circuit, and an output circuit. The input circuit performs numerous functions, including shaping the waveforms of input signals from the various sensors; correcting the voltage levels of the input signals to a predetermined level; and converting analog signal values into digital signal values. The memory circuit preliminarily stores various operating programs to be executed by the CPU and stores results of the computations, and the like, by the CPU. The output circuit supplies control signals to the fuel injection valve 4, and the like. The CPU in the ECU 20 performs the misfire detection described below.

The method of the misfire detection according to the first embodiment will now be described.

Figure 2A:
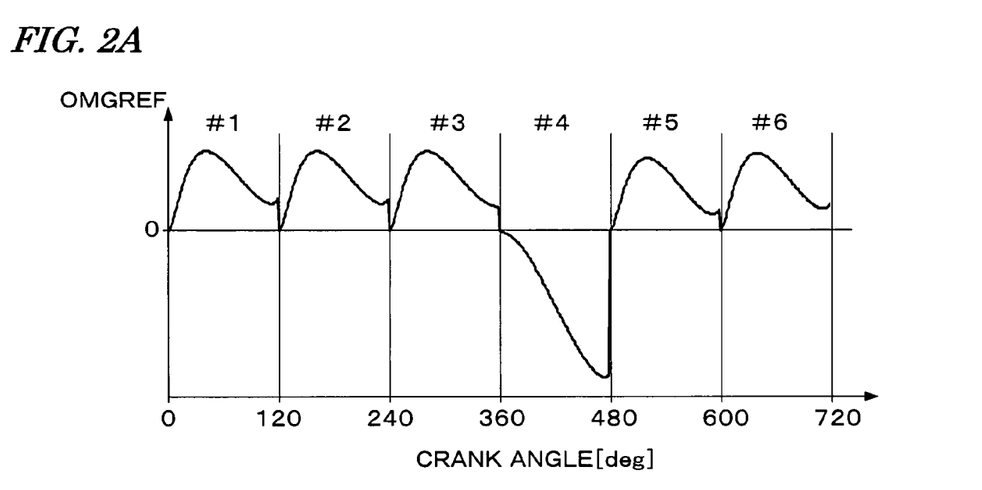
FIGS. 2A and 2B are a time chart and a bar graph, respectively, illustrating a method of the misfire determination.

FIG. 2A is a time chart showing changes in a relative rotational speed OMGREF with reference to a rotational speed (hereinafter referred to as "reference rotational speed") detected at the time a piston of each cylinder is positioned in the vicinity of a compression top dead center of each cylinder of the engine 1. The compression top dead center is defined as a top dead center from which the combustion stroke of each cylinder starts. In the following explanation, the description of "at the compression top dead center of each cylinder" or "in the vicinity of the compression top dead center of each cylinder" means "at the time the piston of each cylinder is positioned at the compression top dead center" or "at the time the piston of each cylinder is positioned in the vicinity of the compression top dead center". The relative rotational speed OMGREF is calculated by subtracting the reference rotational speed from a rotational speed detected at every six degrees of the crank angle (calculated from the time period parameter CRME). #1 to #6 in FIG. 2A are cylinder discrimination numbers (which are different from the cylinder numbers described below) for discriminating the six cylinders numbered in the order of ignition. In the combustion stroke after the compression top dead center, if ignition is performed normally, the relative rotational speed OMGREF takes a positive value. But, if a misfire occurs, the relative rotational speed OMGREF takes a negative value. That is, in the example shown in FIG. 2A, the normal combustion is performed in cylinders #1 to #3, #5, and #6, and a misfire has occurred in cylinder #4. Therefore, an integrated value obtained by integrating the relative rotational speed OMGREF calculated at every six degrees of the crank angle during the 1 TDC period (period of 120 degrees of the crank angle corresponding to the combustion stroke) takes a negative value for cylinder #4, where a misfire has occurred, and takes a positive value for the cylinder where the normal combustion is performed as indicated by the bar graphs (i.e., see the bar graphs on the right side with no hatching) of FIG. 2B. Accordingly, the cylinder where a misfire has occurred is determined. The integrated value obtained by the above-described calculation is a parameter indicative of a torque generated by each cylinder.

Figure 2B:
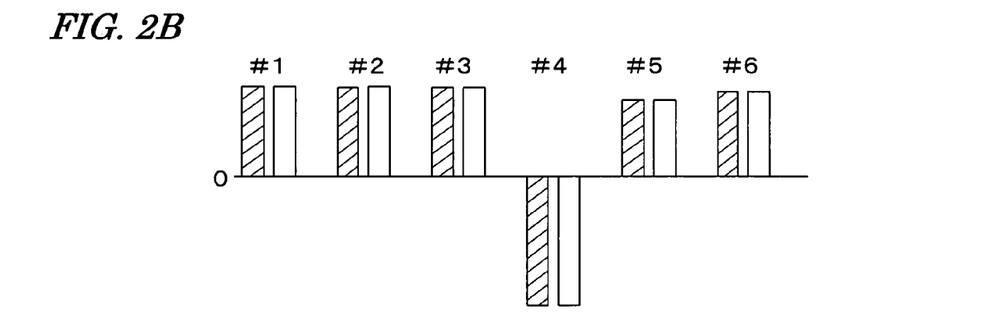

The bar graphs with hatching shown in FIG. 2B show an integrated value obtained by integrating a relative time period parameter CRMEREF with reference to a time period parameter (hereinafter referred to as "reference time period parameter") detected in the vicinity of the compression top dead center for one TDC period. The relative time period parameter CRMEREF is calculated by subtracting a time period parameter detected at every six degrees of the crank angle from the reference time period parameter. That is, the relative time period parameter CRMEREF takes a positive value if the torque is generated by the combustion but takes a negative value if the torque is not generated due to a misfire. Therefore, the relative time period parameter CRMEREF takes a negative value for cylinder #4, where a misfire has occurred, and takes a positive value for the cylinders where the normal combustion is performed, similar to the integrated value of the relative rotational speed OMGREF. Therefore, it is possible to similarly perform the misfire determination using the time period parameter CRME without converting the time period parameter CRME to the rotational speed OMG.

Figure 3A:
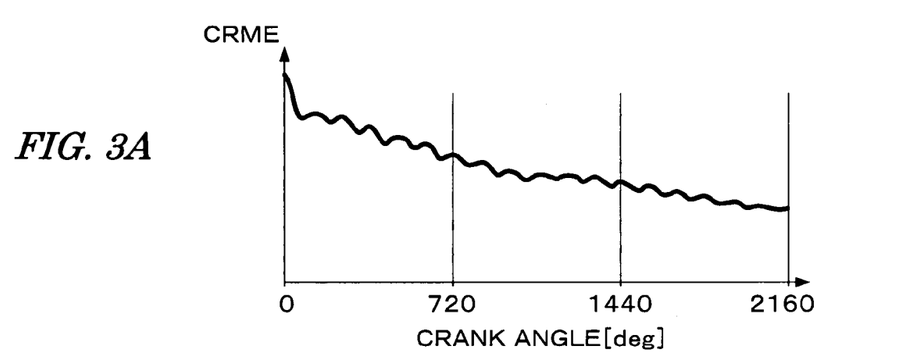
FIGS. 3A-3C and 4A-4C are time charts illustrating changes in the parameters calculated for the misfire determination.
Figure 3B:
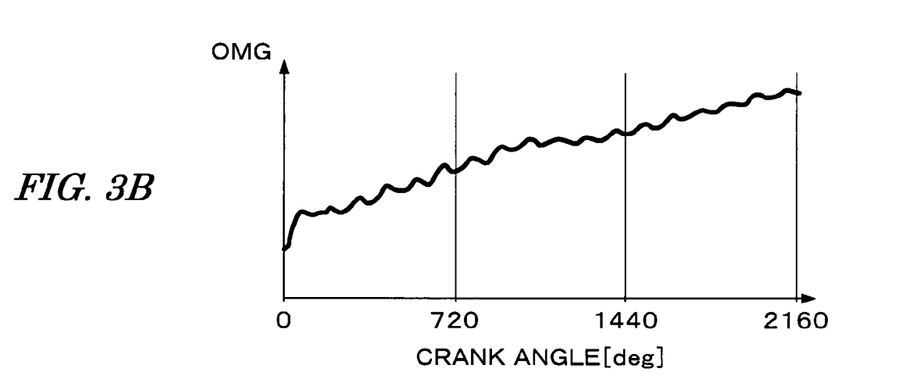
Figure 3C:
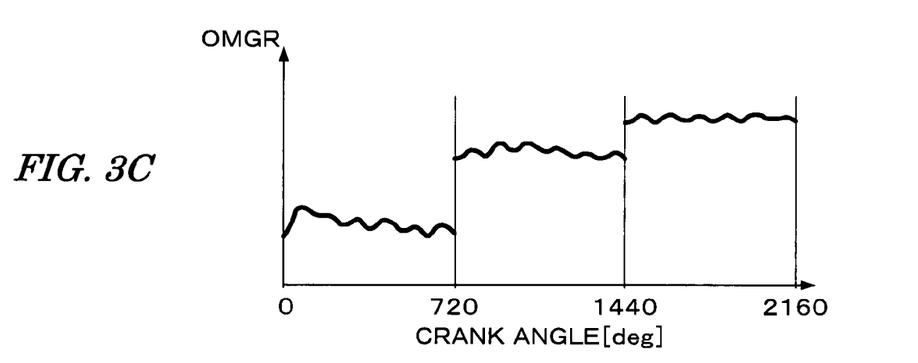

FIGS. 3A-3C and 4A-4C are time charts more specifically explaining the above-described misfire determination method. In FIGS. 3A-3C and 4A-4C, an example where the engine rotational speed NE gradually rises is illustrated. FIG. 3A shows changes in the time period parameter CRME, and FIG. 3B shows changes in the rotational speed OMG calculated from the time period parameter CRME. FIG. 3C shows changes in a filtered rotational speed OMGR calculated by performing a 720-degree filtering on the rotational speed OMG. The 720-degree filtering is a filtering for extracting a changing component within a comparatively short period by canceling a linearly changing component in one combustion cycle period. The details of this filtering will be described later. The 720-degree filtering is performed to eliminate a rotational speed changing component due to a torque applied to the engine from a load on the engine (a torque applied from wheels of the vehicle and auxiliaries driven by the engine 1, a torque due to the friction of the sliding parts of the engine 1, and the like).

Figure 4A:
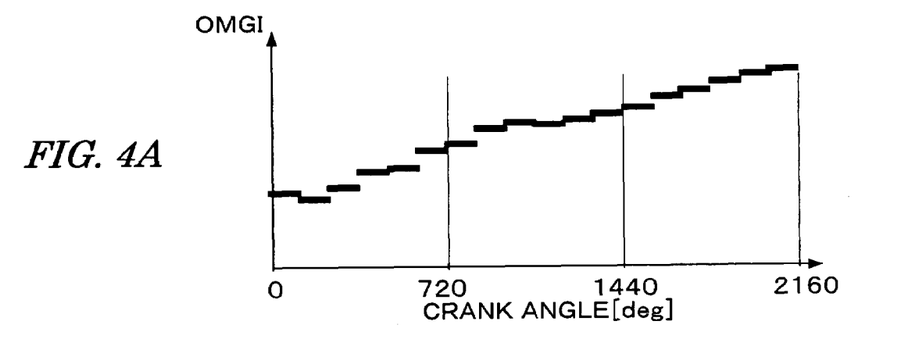

FIG. 4A shows changes in an inertial force rotational speed OMGI calculated at the same time the reference rotational speed in the vicinity of the compression top dead center of each cylinder is calculated. The inertial force rotational speed OMGI is calculated according to a total mass of reciprocating parts (pistons and connecting rods) of the engine 1, a length of the connecting rod, a crank radius, and an inertia moment due to rotating parts driven by the engine 1, such as a crank pulley, a torque converter, and a lockup clutch.

Figure 4B:
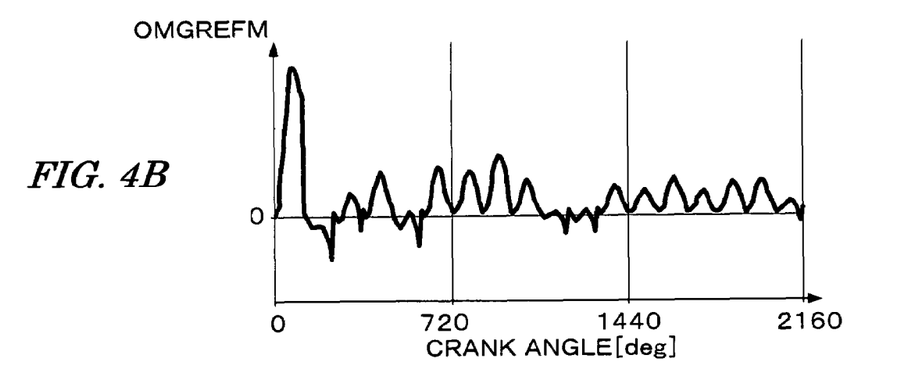
Figure 4C:
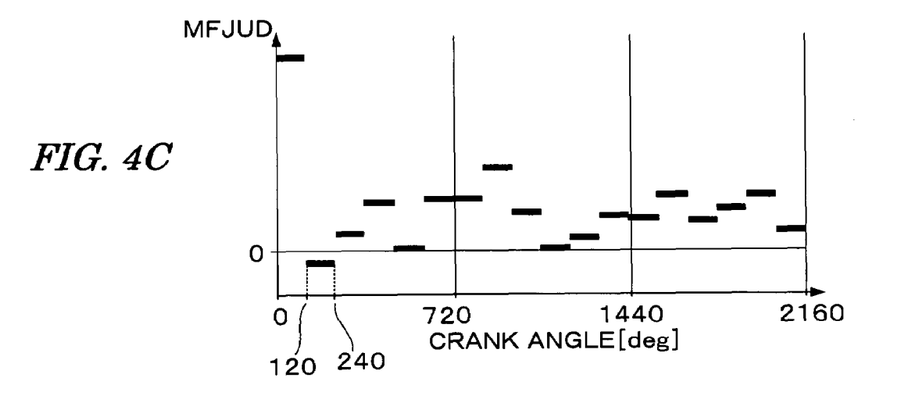

FIG. 4B shows changes in a modified relative rotational speed OMGREFM (=OMGREF+OMGI) calculated by adding the inertial force rotational speed OMGI to the relative rotational speed OMGREF. FIG. 4C shows changes in a determination parameter MFJUD which is an integrated value calculated by integrating the modified relative rotational speed OMGREFM for one TDC period. In this example, the determination parameter MFJUD takes a negative value corresponding to a range of 120 to 240 degrees of the crank angle, and it is determined that a misfire has occurred in cylinder #2.

Figure 5:
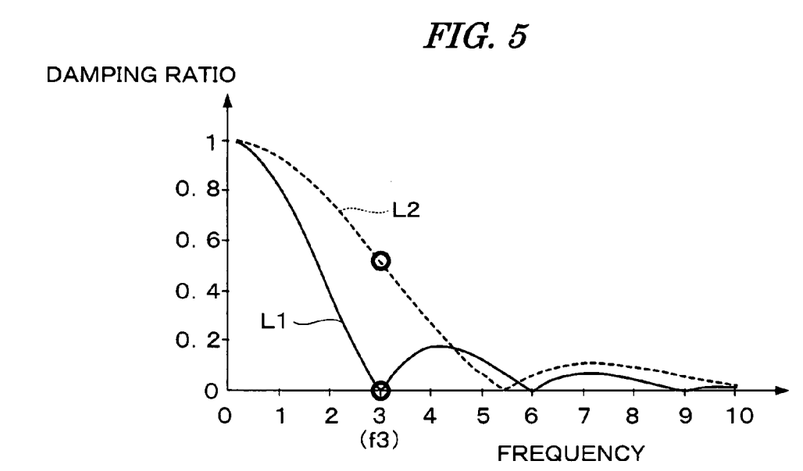
FIG. 5 is a graph illustrating frequency characteristics of a low-pass filtering.

FIG. 5 is a graph illustrating frequency characteristics of a low-pass filtering of the detected time period parameter CRME. The horizontal axis represents a frequency normalized by the frequency corresponding to the engine rotational speed NE. In FIG. 5, the solid line L1 indicates a characteristic of the low-pass filtering applied in this embodiment, and the dashed line L2 indicates a characteristic of a conventional low-pass filtering for comparison. In this embodiment, the low-pass filtering is performed so that a frequency component of a frequency f3, which is three times as high as the frequency corresponding to the engine rotational speed NE, and harmonics components of the frequency f3, become "0". The low-pass filtering is performed by a moving averaging calculation of the time period parameter CRME sampled during 120 degrees of the crank angle (1 TDC period). The above-described rotational speed changing component due to crankshaft torsion is a component of the frequency f3 and is eliminated by the low-pass filtering shown by the solid line L1.

It is to be noted that the above-described inertial force rotational speed OMGI is eliminated by the moving averaging calculation, since the inertial force rotational speed OMGI periodically changes in the frequency f3. Therefore, in this embodiment, it is not necessary to add the inertial force rotational speed OMGI to the relative rotational speed OMGREF, and the misfire determination is performed using the relative rotational speed OMGREF.

Figure 6A:
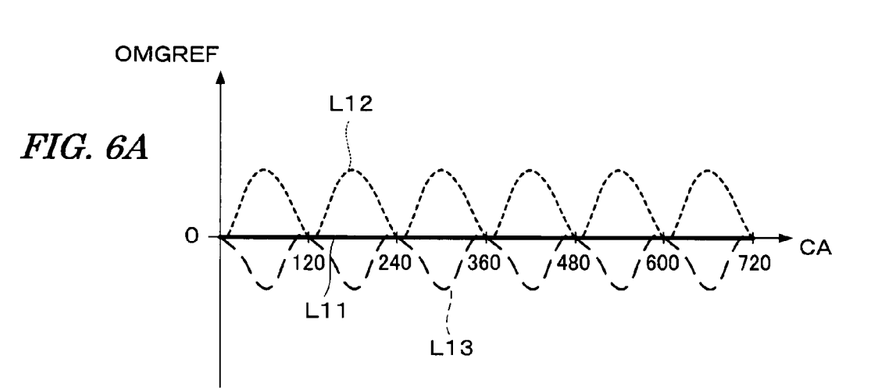
FIGS. 6A and 6B are charts illustrating influence of the crankshaft torsion in the high rotational speed region of the engine.
Figure 6B:
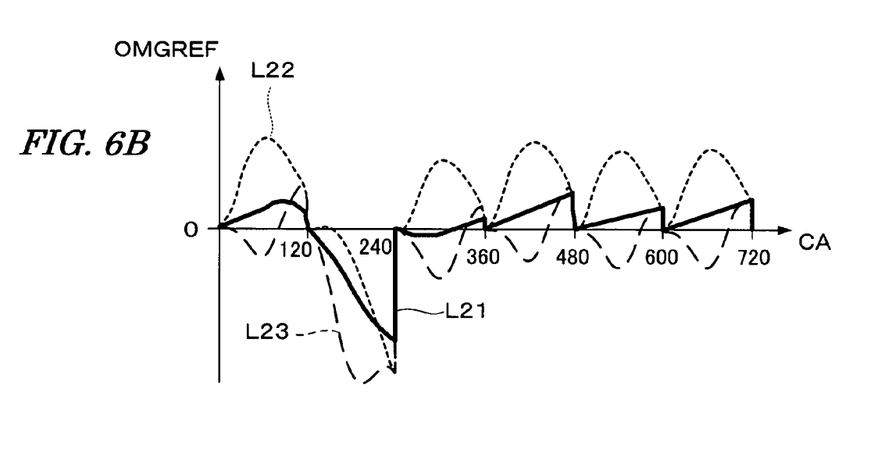

FIGS. 6A and 6B are waveforms of the relative rotational speed OMGREF illustrating the influence of the crankshaft torsion in the high rotational speed region of the engine. FIG. 6A shows waveforms observed when the normal combustion is performed (NE:6500 rpm, PBA:40 kPa), and the dashed lines L12 and L13 (the difference between L12 and L13 is due to a difference in the amount of the crankshaft torsion) correspond to examples in which the conventional low-pass filtering indicated by the dashed line L2 in FIG. 5 is performed. The solid line L11 corresponds to this embodiment in which the low-pass filtering using the moving averaging calculation is performed. When the relative rotational speed OMGREF takes a negative value, as shown by the dashed line L13 due to influence of the crankshaft torsion, there is a possibility that an erroneous determination that a misfire has occurred may be made although no misfire has actually occurred. On the other hand, if the relative rotational speed OMGREF takes a positive value, as shown by the dashed line L12, there is a possibility that another erroneous determination that normal combustion is performed may be made although a misfire has actually occurred. By performing the moving averaging calculation, influence of the crankshaft torsion is completely eliminated as shown by the solid line L11.

FIG. 6B shows waveforms when a misfire has occurred. The solid line L21 and the dashed lines L22 and L23 in FIG. 6B correspond, respectively, to the solid line L11 and the dashed lines L12 and L13 of FIG. 6A. FIG. 6B shows an example in which a misfire has occurred when the crank angle CA is in the range from 120 to 240 degrees. Even when performing the low-pass filtering by the moving averaging calculation, the relative rotational speed OMGREF largely changes in the negative direction when a misfire has occurred. Therefore, a misfire is accurately determined. Preferably, the determination threshold value is not set to "0" but to a negative value MFJTH, and it is determined that a misfire has occurred when the determination parameter MFJUD, which is an integrated value of the relative rotational speed OMGREF, becomes less than the determination threshold value MFJTH.

Figure 7:
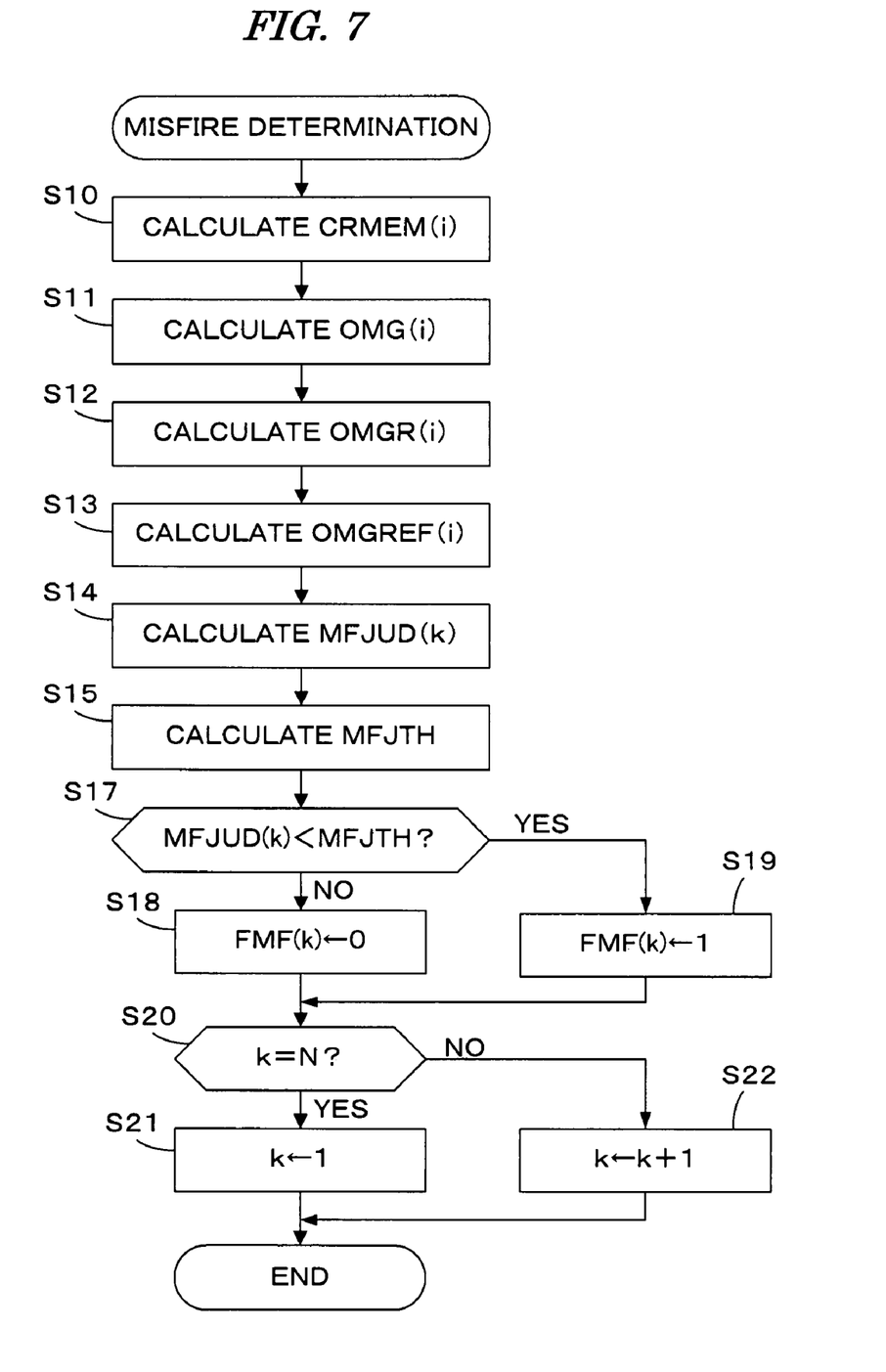
FIG. 7 is a flowchart of a process of the misfire determination according to the first embodiment.

FIG. 7 is a flowchart of a misfire determination process. The misfire determination process is executed by the CPU in the ECU 20 in synchronicity with the TDC pulse generation. The time period parameter CRME(i), which is a time interval of the CRK pulse generated at every six degrees of the crank angle, is detected and the data of the detected time period parameter CRME(i) corresponding to an angular range of 720 degrees of the crank angle (i=0−(ND−1) and the data number ND is "120") are stored in a buffer memory in the memory circuit. Further, if a cylinder discrimination number, which is numbered in the order of ignition, is expressed by "k" (=1 to 6) and a number of data corresponding to one TDC period is expressed by "NTDC" (NTDC=20 in this embodiment), calculations in which the parameter "i" takes values from (k−1) NTDC to (kNTDC−1) are performed by one execution of the process. For example, when the process performs the calculations corresponding to the first cylinder (k=1), the parameter "i" takes values from "0" to (NTDC−1), and when the process performs the calculations corresponding to the fifth cylinder (k=5), the parameter "i" takes values from 4NTDC to (5NTDC−1).

In step S10, the moving averaging calculation of the time period parameter CRME(i) is performed by equation (1a) or (1b) to calculate an averaged time period parameter CRMEM (i). It is to be noted that the data number NTDC is generally given by equation (2).

$$CRMEM(i) = \sum_{j=-NTDC/2}^{NTDC/2-1} CRME(i+j)/NTDC \ (NTDC: \text{even number}) \quad (1a)$$

$$CRMEM(i) = \sum_{j=(NTDC-1)/2}^{(NTDC-1)/2} CRME(i+j)/NTDC \ (NTDC: \text{odd number}) \quad (1b)$$

$$NTDC = 720/(N \times D\theta) \quad (2)$$

where "N" is a number of cylinders, and "Dθ" is an angular interval 720/ND [degrees] of measuring the time period parameter CRME. "Dθ" is equal to "6" degrees in this embodiment.

In step S11, the averaged time period parameter CRMEM (i) is converted to a rotational speed OMG(i) [rad/s] by equation (3).

$$OMG(i)=D\theta/CRMEM(i) \quad (3)$$

In step S12, the 720-degree filtering is performed to calculate a filtered rotational speed OMGR(i) by equation (4).

$$OMGR(i)=OMG(i)-(OMG(ND)-OMG(0))\times D\theta\times i/720 \quad (4)$$

In step S13, the relative rotational speed OMGREF is calculated by equation (5).

$$OMGREF(i)=OMGR(i)-OMGR((k-1)NTDC) \quad (5)$$

where OMGR((k−1)NTDC) is the reference rotational speed which corresponds to the filtered rotational speed when the piston of the cylinder subjected to the determination is positioned at the compression top dead center.

In step S14, the determination parameter MFJUD(k) is calculated as an integrated value of the relative rotational speed OMGREF by equation (6).

$$MFJUD(k) = \sum_{i=(k-1)NTDC}^{kNTDC-1} OMGREF(i) \quad (6)$$

In step S15, a MFJTH map (not shown) is retrieved according to the engine rotational speed NE and the intake pressure PBA to calculate the determination threshold value MFJTH (<0). The MFJTH map is set so that the absolute value of the determination threshold value MFJTH decreases as the engine rotational speed NE increases, and the absolute value of the determination threshold value MFJTH increases as the intake pressure PBA increases.

In step S17, it is determined whether the determination parameter MFJUD(k) is less than the determination threshold value MFJTH. If the answer to step S17 is negative (NO), it is determined that a normal combustion is performed, and a misfire flag FMF(k) is set to "0" (step S18). On the other hand, if MFJUD(k) is less than MFJTH, it is determined that a misfire has occurred in cylinder #k, and the misfire flag FMF (k) is set to "1" (step S19).

In step S20, it is determined whether the cylinder discrimination number k is equal to the number N of cylinders. If the answer to step S20 is negative (NO), the cylinder discrimination number k is incremented by "1" (step S22). If the cylinder discrimination number k is equal to the number N of cylinders, the cylinder discrimination number k is returned to "1" (step S21).

The misfire determination is performed for each cylinder by the process of FIG. 7.

As described above, in this embodiment, the moving averaging calculation of the time period parameter CRME detected during the period of 120 degrees of the crank angle is performed to calculate the averaged time period parameter CRMEM. Therefore, the frequency component (third harmonic component) of a frequency three times as high as the frequency corresponding to the engine rotational speed NE and harmonics of the third harmonic component are eliminated by the moving averaging calculation. Since influence of the crankshaft torsion greatly appears in the third harmonic component in the case of a six-cylinder engine, influence of the crankshaft torsion is almost entirely eliminated by the above-described moving averaging calculation. Consequently, accurate misfire determination is performed, especially in the high rotational speed region of the engine.

Further, the reference rotational speed OMGR((k−1) NTDC), which is a reference value of the rotational speed OMG corresponding to the averaged time period parameter CRMEM, is calculated; a deviation of the rotational speed OMGR from the reference rotational speed OMGR((k−1) NTDC) is calculated as the relative rotational speed OMGREF; and the misfire determination is performed based on the determination parameter MFJUD obtained by integrating the relative rotational speed OMGREF. The determination parameter MFJUD indicates a change in torque generated by the cylinder during the combustion stroke. Therefore, when the determination parameter MFJUD becomes less than the determination threshold value MFJTH, it is possible to determine that misfire has occurred. Since this determination is performed for each cylinder, it is also possible to easily specify the cylinder in which a misfire has occurred regardless of the number of cylinders in the engine.

Further, the determination threshold value MFJTH is set according to the engine rotational speed NE and the intake pressure PBA. Accordingly, the misfire determination is accurately performed regardless of the engine rotational speed NE and the engine load.

In this embodiment, the crank angle position sensor 12 corresponds to the rotational speed parameter detecting means, and the ECU 20 includes the moving averaging means, the reference value calculating means, the relative speed parameter calculating means, and the misfire determination means. Specifically, step S10 of FIG. 7 corresponds to the moving averaging means; step S13 corresponds to the reference value calculating means and the relative speed parameter calculating means; and steps S14, S15, and S17 to S19 correspond to the misfire determining means.

Second Embodiment

In the above-described embodiment, the averaged time period parameter CRMEM is converted into the rotational speed OMG and the misfire determination is performed using the rotational speed OMG as the speed parameter. In this embodiment, the misfire determination is performed using the averaged time period parameter CRMEM as the speed parameter. The present embodiment is the same as the first embodiment except for the points described below.

Figure 8:
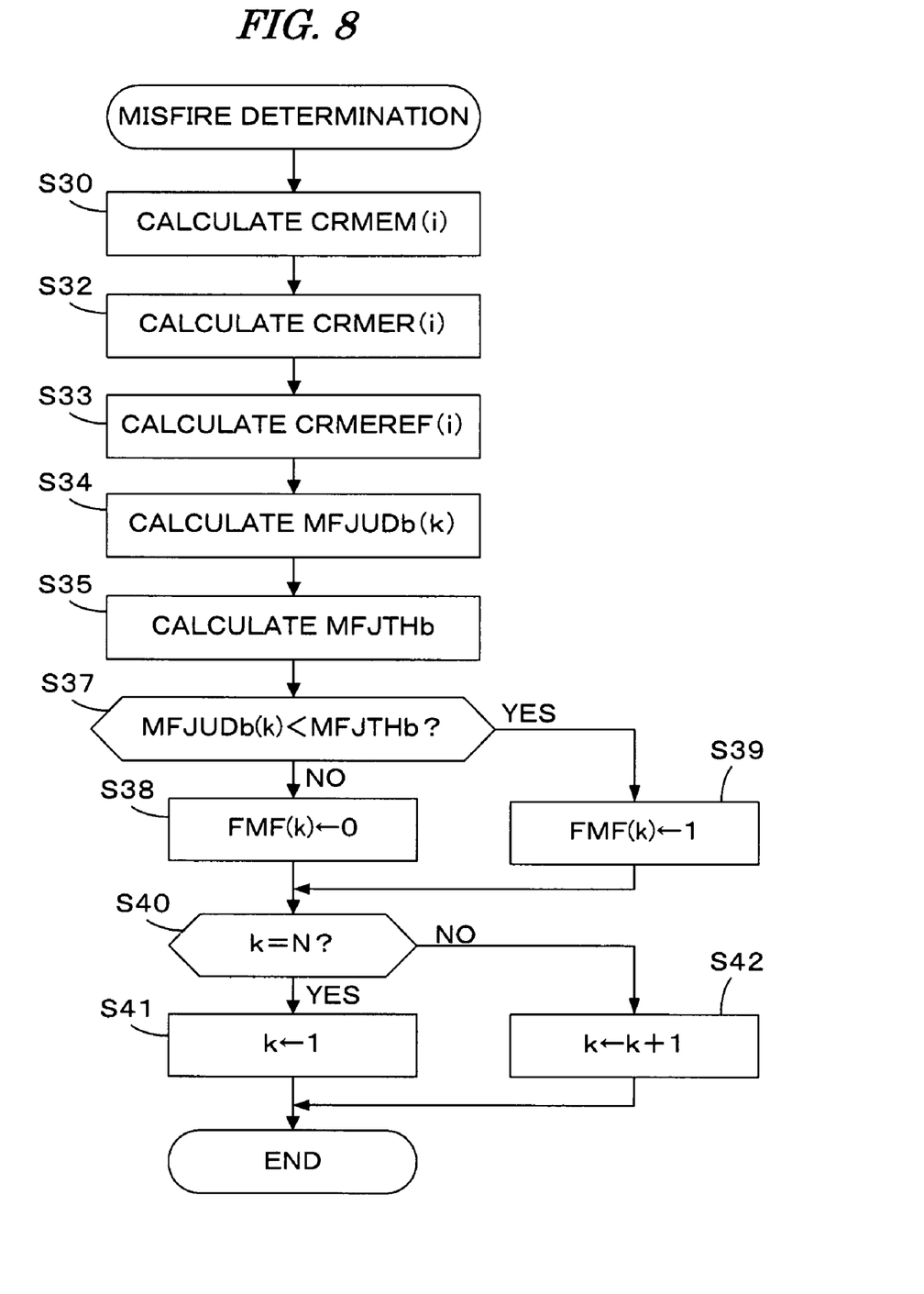
FIG. 8 is a flowchart of a process of the misfire determination according to the second embodiment.

FIG. 8 is a flowchart of the misfire determination process using the time period parameter CRME as the speed parameter.

In step S30, the averaged time period parameter CRMEM(i) is calculated by equation (1).

In step S32, the 720-degree filtering is performed by equation (21) to calculate a filtered time period parameter CRMER(i).

$$CRMER(i)=CRMEM(i)-(CRMEM(0)-CRMEM(ND))\times D\theta \times i/720 \quad (21)$$

In step S33, the relative time period parameter CRMEREF(i) is calculated by equation (22).

$$CRMEREF(i)=CRMER((k-1)NTDC)-CRMER(i) \quad (22)$$

where CRMER((k-1) NTDC) is a reference time period parameter which corresponds to the filtered time period parameter at the compression top dead center of the cylinder subjected to the misfire determination.

In step S34, a determination parameter MFJUDb(k) is calculated as an integrated value of the relative time period parameter CRMEREF by equation (23).

$$MFJUDb(k) = \sum_{i=(k-1)NTDC}^{kNTDC-1} CRMEREF(i) \quad (23)$$

In step S35, a MFJTHb map (not shown) is retrieved according to the engine rotational speed NE and the intake pressure PBA to calculate a determination threshold value MFJTHb (<0). The MFJTHb map is set so that the absolute value of the determination threshold value MFJTHb decreases as the engine rotational speed NE increases, and the absolute value of the determination threshold value MFJTHb increases as the intake pressure PBA increases.

In step S37, it is determined whether the determination parameter MFJUDb(k) is less than the determination threshold value MFJTHb. If the answer to step S37 is negative (NO), it is determined that the normal combustion is performed, and the misfire flag FMF (k) is set to "0" (step S38). On the other hand, If MFJUDb(k) is less than MFJTHb, it is determined that the misfire has occurred in #k cylinder, and the misfire flag FMF (k) is set to "1" (step S39).

In step S40, it is determined whether the cylinder discrimination number k is equal to the number N of cylinders. If the answer to step S40 is negative (NO), the cylinder discrimination number k is incremented by "1" (step S42). If the cylinder discrimination number k is equal to the number N of cylinders, the cylinder discrimination number k is returned to "1" (step S41).

As described above with reference to FIG. 2B, the integrated value of the relative time period parameter CRMEREF changes like the integrated value of the relative rotational speed OMGREF, depending on whether a misfire has occurred. Therefore, it is possible to accurately perform the misfire determination with respect to each cylinder similar to the first embodiment.

In the present embodiment, step S30 of FIG. 8 corresponds to the moving averaging means, step S33 corresponds to the reference value calculating means and the relative speed parameter calculating means, and steps S34, S35, and S37 to S39 correspond to the misfire determining means.

The present invention is not limited to the embodiments described above, and various modifications thereto may be made. For example, in the above-described embodiments, an example where the present invention is applied to a six-cylinder engine is shown. The present invention can be applied to any engine regardless of the number of cylinders. Further, the present invention can be applied to the misfire determination for a gasoline engine, wherein fuel is directly injected into a combustion chamber, or applied to the misfire determination for a diesel engine. Further, the present invention can be applied to the misfire determination of a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A misfire detecting apparatus for an internal combustion engine, having rotational speed parameter detecting means for detecting a rotational speed parameter indicative of a rotational speed of said engine, and detecting a misfire of said engine based on the detected rotational speed parameter, the misfire detecting apparatus comprising:

moving averaging means for performing a moving averaging calculation with respect to data of the detected rotational speed parameter to calculate an averaged speed parameter, wherein a number of the data is equal to a sampling number (NTDC);

reference value calculating means for calculating a reference value of the averaged speed parameter;

relative speed parameter calculating means for calculating a relative speed parameter, which is a deviation of the averaged speed parameter corresponding to the rotational speed parameter detected at every predetermined crank angle from the reference value;

integrated value calculating means for calculating an integrated value of the relative speed parameter; and misfire determining means for performing a misfire determination based on the integrated value, wherein the sampling number (NTDC) is determined by an equation:

$$NTDC=720/(N \times D\theta)$$

where (N) is a number of cylinders of said engine, and (D$\theta$) is a sampling angular period (degree) of the rotational speed parameter.

2. A misfire detecting apparatus according to claim 1, wherein the reference value is the averaged speed parameter when a piston in a cylinder, which is subjected to the misfire determination, is positioned in a vicinity of a compression top dead center.

3. A misfire detecting apparatus according to claim 1, wherein said misfire determining means sets a determination threshold value according to the rotational speed of said engine and a load on said engine, and performs the misfire determination according to whether the integrated value is less than the determination threshold value.

4. A misfire detecting method for an internal combustion engine, comprising the steps of:
   a) detecting a rotational speed parameter indicative of a rotational speed of said engine;
   b) performing a moving averaging calculation with respect to data of the detected rotational speed parameter to calculate an averaged speed parameter, a number of the data being equal to a sampling number (NTDC);
   c) calculating a reference value of the averaged speed parameter;
   d) calculating a relative speed parameter, which is a deviation of the averaged speed parameter corresponding to the rotational speed parameter detected at every predetermined crank angle from the reference value;
   e) calculating an integrated value of the relative speed parameter; and
   f) performing a misfire determination based on the integrated value,
   wherein the sampling number (NTDC) is determined by an equation:

$$NTDC = 720/(N \times D\theta)$$

where (N) is a number of cylinders of said engine, and (Dθ) is a sampling angular period (degree) of the rotational speed parameter.

5. A misfire detecting method according to claim 4, wherein the reference value is the averaged speed parameter detected when a piston in a cylinder, which is subjected to the misfire determination, is positioned in a vicinity of a compression top dead center.

6. A misfire detecting method according to claim 4, wherein said step f) comprises the steps of:
   i) setting a determination threshold value according to the rotational speed of said engine and a load on said engine; and
   ii) performing the misfire determination according to whether the integrated value is less than the determination threshold value.

7. A computer program embodied on a computer-readable medium, for causing a computer to implement a misfire detecting method for an internal combustion engine, said misfire detecting method comprising the steps of:
   a) detecting a rotational speed parameter indicative of a rotational speed of said engine;
   b) performing a moving averaging calculation with respect to data of the detected rotational speed parameter to calculate an averaged speed parameter, a number of the data being equal to a sampling number (NTDC);
   c) calculating a reference value of the averaged speed parameter;
   d) calculating a relative speed parameter, which is a deviation of the averaged speed parameter corresponding to the rotational speed parameter detected at every predetermined crank angle from the reference value;
   e) calculating an integrated value of the relative speed parameter; and
   f) performing a misfire determination based on the integrated value,
   wherein the sampling number (NTDC) is determined by an equation:

$$NTDC = 720/(N \times D\theta)$$

where (N) is a number of cylinders of said engine, and (Dθ) is a sampling angular period (degree) of the rotational speed parameter.

8. A computer program according to claim 7, wherein the reference value is the averaged speed parameter detected when a piston in a cylinder, which is subjected to the misfire determination, is positioned in a vicinity of a compression top dead center.

9. A computer program according to claim 7, wherein said step f) comprises the steps of:
   i) setting a determination threshold value according to the rotational speed of said engine and a load on said engine; and
   ii) performing the misfire determination according to whether the integrated value is less than the determination threshold value.

* * * * *